United States Patent
Orazbayev

(10) Patent No.: US 10,550,945 B2
(45) Date of Patent: Feb. 4, 2020

(54) EMERGENCY SHUTDOWN VALVES WITH BYPASS FEATURES

(71) Applicant: Ohio University, Athens, OH (US)

(72) Inventor: Azamat Orazbayev, Worthington, OH (US)

(73) Assignee: Ohio University, Athens, OH (US)

( * ) Notice: Subject to any disclaimer, the term of this patent is extended or adjusted under 35 U.S.C. 154(b) by 315 days.

(21) Appl. No.: 14/786,693

(22) PCT Filed: Apr. 24, 2014

(86) PCT No.: PCT/US2014/035305
§ 371 (c)(1),
(2) Date: Oct. 23, 2015

(87) PCT Pub. No.: WO2014/176430
PCT Pub. Date: Oct. 30, 2014

(65) Prior Publication Data
US 2016/0076656 A1    Mar. 17, 2016

Related U.S. Application Data

(60) Provisional application No. 61/816,037, filed on Apr. 25, 2013.

(51) Int. Cl.
| | |
|---|---|
| *F16K 5/06* | (2006.01) |
| *F16K 27/04* | (2006.01) |
| *F16K 27/06* | (2006.01) |
| *F16K 1/52* | (2006.01) |
| *F16K 1/22* | (2006.01) |

(Continued)

(52) U.S. Cl.
CPC .............. *F16K 1/526* (2013.01); *F16K 1/222* (2013.01); *F16K 1/223* (2013.01); *F16K 3/0209* (2013.01); *F16K 3/32* (2013.01); *F16K 5/0605* (2013.01); *F16K 5/10* (2013.01); *F16K 7/126* (2013.01); *F16K 27/0236* (2013.01); *F16K 27/0245* (2013.01); *F16K 27/04* (2013.01); *F16K 27/067* (2013.01)

(58) Field of Classification Search
CPC .......... F16K 1/526; F16K 1/222; F16K 1/223; F16K 3/0209; F16K 3/32; F16K 5/0605; F16K 5/10; F16K 7/126; F16K 27/036; F16K 27/0245; F16K 27/04; F16K 27/067; F16K 37/0075
USPC ........................................................... 73/168
See application file for complete search history.

(56) References Cited

U.S. PATENT DOCUMENTS 3,483,733 A * 12/1969 Hinderer ................. G01M 3/00
251/315.13
3,604,446 A * 9/1971 Brooks ................. F16K 17/105
137/115.03

(Continued)

FOREIGN PATENT DOCUMENTS

CA       2984489 A1 * 12/2015

*Primary Examiner* — Nimeshkumar D Patel
*Assistant Examiner* — Nashmiya S Fayyaz
(74) *Attorney, Agent, or Firm* — Standley Law Group LLP

(57) ABSTRACT

A bypass feature and an emergency shutdown valve that includes such a bypass feature, which is selectively operable to permit a flow of material to pass through the emergency shutdown valve when a shutoff element thereof is closed so as to otherwise prohibit flow through the valve, as well as an associated method of testing an emergency shutdown valve.

10 Claims, 7 Drawing Sheets

(51) Int. Cl.

| | |
|---|---|
| *F16K 3/02* | (2006.01) |
| *F16K 3/32* | (2006.01) |
| *F16K 5/10* | (2006.01) |
| *F16K 7/12* | (2006.01) |
| *F16K 27/02* | (2006.01) |

(56) References Cited

U.S. PATENT DOCUMENTS

| | | | |
|---|---|---|---|
| RE30,261 E * | 4/1980 | Brand | G05D 7/0126 |
| | | | 137/115.15 |
| 4,202,368 A | 5/1980 | Akkerman et al. | |
| 5,107,896 A * | 4/1992 | Otto | B01D 35/043 |
| | | | 137/625.29 |
| 5,209,454 A | 5/1993 | Engdahl et al. | |
| 5,433,239 A | 7/1995 | Taylor | |
| 5,437,307 A * | 8/1995 | Cianfrocca, II | F16K 5/0605 |
| | | | 137/614.17 |
| 5,586,579 A * | 12/1996 | Diehl | F16K 5/0605 |
| | | | 137/493.8 |
| 6,425,022 B1 | 8/2002 | Albuaijan | |
| 7,287,551 B2 | 10/2007 | James | |
| 7,504,961 B2 | 3/2009 | Flanders | |
| 8,072,343 B2 | 12/2011 | Flanders | |
| 8,584,705 B2 * | 11/2013 | Hughes | F16K 5/0207 |
| | | | 137/269.5 |
| 2009/0222233 A1 * | 9/2009 | Al-Buaijan | F15B 19/005 |
| | | | 702/114 |
| 2011/0155937 A1 | 6/2011 | Arnold | |
| 2011/0272044 A1 | 11/2011 | Bolyard, Jr. | |
| 2017/0016545 A1 * | 1/2017 | Wang | F16K 11/0873 |

\* cited by examiner

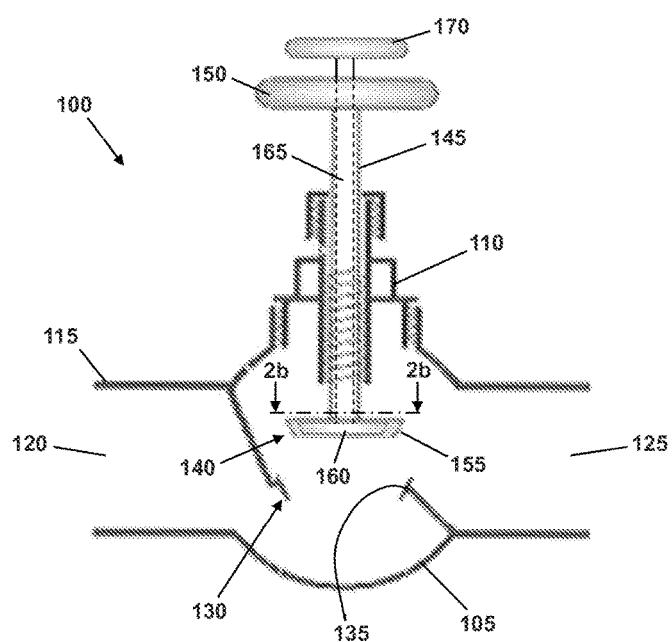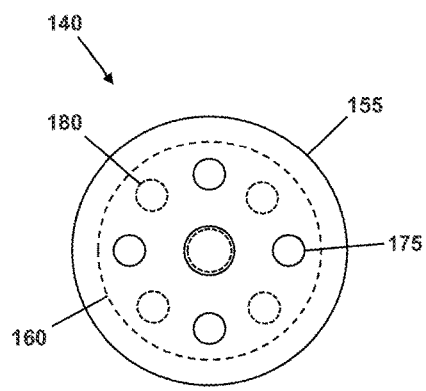
*FIG. 2a*
*FIG. 2b*

EMERGENCY SHUTDOWN VALVES WITH BYPASS FEATURES

TECHNICAL FIELD

The present invention is directed to emergency shutdown valves that are provided with bypass features for use during valve testing.

BACKGROUND

Various industrial processes may require a continuous flow of liquids or gases. These materials are commonly supplied from a source via conduit, such as low or high pressure piping. If an emergency situation arises, an immediate shutdown of the flow of such materials may be required—particularly (although not exclusively) in the case of flammable, explosive or otherwise hazardous materials.

An emergency shutdown valve is typically installed in a conduit that carries liquids or gases in a given facility. In the case of an emergency shutdown situation, the emergency shutdown valve must reliably cutoff the flow of material. Depending on the applicable safety requirements, such shutdown valves must typically operate to cut off the flow with a probability of failure of less than $10^{-3}$-$10^{-9}$.

Under normal operating conditions, a continuous flow of material through a given conduit and its associated emergency shutdown valve(s) may be maintained without any interruptions for a relatively long period of time. For example, a given shutoff valve may not be used for several years or may never be used for its intended purpose.

Consequently, safety precautions generally dictate and applicable government agencies normally require companies to test their emergency shutdown valves on a regular basis in order to ensure that the emergency shutdown valves will operate properly if an emergency shutdown situation actually arises. As should be apparent to one of skill in the art, this mandatory testing of emergency shutdown valves is desirable for a number of reasons. First, such testing ensures that the emergency shutdown valves themselves are not defective and will move and otherwise function as expected. Testing is also desirable because material may flow through the valves under extreme conditions such as high or low temperatures and high pressures, and testing may expose defects or other problems that could lead to valve failure when subjected to such conditions. Additionally, the material flowing through the valves may also comprise chemically aggressive media that can produce condensate bumps, corrosion, and/or defects inside the associated conduit that can block emergency shutdown valves and lead to catastrophic results. Consequently, regular valve testing may also help to reveal such conditions before they can adversely affect valve operation.

Therefore, entities such as industrial companies, etc., that have facilities where emergency shutdown valves are present, routinely test the emergency shutdown valves for proper operation as required by law or possibly more frequently as dictated by internal safety standards. The interval of such scheduled emergency shutdown valve testing is commonly much shorter than several years, and may be even more frequent.

A common and major problem associated with the testing of emergency shutdown valves is the very stoppage of flow that the valves are designed to produce. That is, while it is obviously required that an emergency shutdown valve stop a flow of material in a true emergency shutdown situation, testing often occurs when a facility would otherwise be operating normally and where stopping the flow of a needed material is undesirable. As a result, valuable production time may be lost as a result of testing an emergency shutdown valve. Because emergency shutdown valves are often present in large-scale industrial manufacturing processes, this lost production may be associated with significant lost revenue.

The aforementioned and disadvantageous loss of production resulting from emergency shutdown valve testing may be exacerbated due to the inert nature of many industrial processes, which require time to stop and restart. As a result, it is not uncommon for a given facility to lose several hundred thousand dollars in production in order to adequately test an emergency shutdown valve.

In light of this problem, there has been a search for a technique of testing emergency shutdown valves that does not require the interruption of an associated industrial (e.g., manufacturing) process. In this regard, it has become known to design material transport systems having duplicative (redundant) emergency shutdown valves. In such a system, a given flow of material may be split into two conduits, each having its own emergency shutdown valve. Consequently, only one emergency shutdown valve at a time needs to be closed during a testing operation, which allows the flow of material to continue—albeit at a reduced rate—through the other conduit and its emergency shutdown valve. Once testing is completed on the first emergency shutdown valve, the other valve may be tested in a like manner. The obvious drawback to this solution is, of course, the need to purchase a redundant emergency shutdown valve at each location where an emergency shutdown valve is needed, and the additional costs associated with splitting a given conduit into two runs and installing, maintaining and testing an extra valve.

An alternative approach has also been suggested whereby the testing process is altered rather than the material transport system. In this approach, a given emergency shutdown valve is simply closed less than completely during testing, which permits some amount of material flow to continue during the testing period. However, this approach obviously cannot ensure with required certainty that the tested emergency shutdown valve will function to completely block material flow in an emergency shutdown situation. As such, use of this technique may result in a potentially dangerous situation.

While alternative testing systems/methods have been proposed and tested, the most simple and the most commonly applied approach to emergency shutdown valve testing is still to test the valves regularly and to tolerate any resulting economic losses due to production interruptions. A better solution is needed, and such solutions are provided by the various possible embodiments of the invention.

BRIEF SUMMARY

Embodiments of the invention generally involve modifications to the various types of valves that may be, and frequently are, used as emergency shutdown valves. More particularly, a bypass feature that typically includes a passageway through a shutoff element of the valve and a movable obstruction that can be used to selectively open or close the passageway, is added to such valves to permit two modes of operation. In one mode of operation, a given valve may be placed in an open (i.e., operating) position whereby material flows through the valve in a normal manner. In this mode, the valve operates like any typical emergency shutdown valve.

Emergency shutdown valves according to the invention are, however, capable of operating in a second mode that is not possible with known emergency shutdown valves. In the second mode of operation, the bypass feature is employed such that a flow of material may pass through the valve while the valve is otherwise in a fully closed position.

The bypass feature is typically opened only for testing purposes, such that the bypass feature remains closed during normal material flow conditions. Consequently, this second mode of operation may be used during the testing procedures described above such that a given emergency shutdown valve may be tested to determine if it achieves full closure while still permitting a flow of material to pass therethrough in support of an associated manufacturing or other operation. Because operation of any bypass feature associated with an emergency shutdown valve of the invention may also be tested separately from testing of valve shutdown function without interrupting normal material flow through the valve, emergency shutdown valves of the invention may be fully tested for material flow stoppage without the need to ever completely terminate material flow.

Various types of valves may be produced or modified according to the invention. For example, an emergency shutoff valve of the invention may take the form of a ball valve—which might perhaps be the most common type of emergency shutdown valve used.

As would be understood by one of skill in the art, a typical ball valve includes a rotatable ball that resides within a like-shaped chamber in the body of the valve. A through-port passes diametrically through the valve such that the through-port may be aligned with the interior bore of a conduit to which the ball valve is installed. The ball may be rotated within the chamber, such as by means of a handle that is attached to a shaft that passes through the valve body and connects to the ball. When the ball is oriented so that the through-port therein is aligned with the conduit bore, material flowing through the conduit is free to flow through the ball and the valve. Conversely, when the ball is rotated so that the through-port therein is oriented transversely to the conduit bore, material flowing through the conduit is completely blocked from flowing through the ball and the valve. Partially blocked ball positions are also possible. The ball would be rotated so that the through-port therein is oriented transversely to the conduit bore during testing of a globe-type emergency shutdown valve, meaning that the flow of material through the valve would be blocked during a testing operation.

In a ball valve version of an emergency shutdown valve embodiment of the invention, a secondary through-port passes through the ball of the valve along an axis that is substantially transverse to the primary though-port thereof. Furthermore, an inner ball, is also present and concentrically and rotatably arranged within the main ball of the ball valve to form an independently rotatable inner ball/outer ball arrangement. Like the outer ball, the inner ball also includes an axial through-port.

The through-port of the inner ball may be aligned with the primary through-port of the outer ball when the valve is placed in a normal operating position, such that a flow of material may pass through the valve. Alternatively, the inner ball may be rotated within the outer ball such that the through-port thereof is aligned with the secondary through-port of the inner ball. Consequently, when the main (outer) ball of the emergency shutdown valve is placed in a closed position during testing, the through-port of the inner ball and the secondary through-port of the outer ball may cooperate to allow a flow of material to continue to pass through the valve.

An alternative embodiment of the invention may take the form of a globe valve. As would be understood by one of skill in the art, a globe valve includes a movable plug that may be engaged with or retracted from the seat of an internal baffle in order to close or open the valve, respectively. As should also be understood, therefore, the plug would be engaged with the seat of the internal baffle during testing of a globe-type emergency shutdown valve, meaning that the flow of material through the valve would be blocked during a testing operation.

In a globe-type emergency shutdown valve embodiment of the invention, the plug portion of the globe valve may be modified to include an inner disk that is rotatable within the body of the plug. Both the disk and the plug may also have one or more orifices passing therethrough. The disk may be rotated within the plug body so that the orifices in each are aligned or misaligned as desired. The disk may include an actuating shaft that is concentrically located within the actuation shaft of the plug for this purpose. With the orifices deliberately misaligned, flow through the valve remains blocked when the plug is sealed against the seat of the internal baffle. However, during a testing operation, the disk may be rotated such that the orifices of the disk and plug are aligned. This allows a flow of material to pass through the disk and the plug, and through the valve, while the emergency shutdown globe valve is being tested.

Another alternative embodiment of the invention may take the form of a butterfly valve. As would be understood by one of skill in the art, a butterfly valve includes a body portion with a bore passing therethrough. A rotatable disk resides within the bore in the body portion. The disk is rotatable about an axis that is perpendicular to the central axis of the bore in the body portion. The diameter of the disk is typically similar to the diameter of the bore. The disk may include a peripheral sealing element that allows the periphery of the disk to seal against the wall of the bore when the disk is appropriately rotated therein.

An actuator is attached to the disk and extends through the body portion of the valve. The actuator is used to rotate the disk between a fully open position, where the edge of the disk is aligned with the flow path through the valve, and a fully closed position where the disk closes off the bore. As should also be understood, the disk would be rotated so as to block off the bore during testing of a butterfly-type emergency shutdown valve, meaning that the flow of material through the valve would be blocked during a testing operation.

In a butterfly-type emergency shutdown valve embodiment of the invention, however, one or more orifices are placed in and pass through the disk. A shutter is also located within the disk. The shutter may also be disk-like in shape and may be linearly or rotatably movable within the disk. For example, the shutter may be attached to a separate, threaded shaft, that is concentrically located within the shaft of the disk or extends from another location on the body portion. In the former case, the shutter actuation shaft may extend beyond the disk actuating handle for connection to a shutter actuation handle. In the latter case, the shutter actuation shaft may extend in a different direction from the disk shaft to connect to a handle.

The shutter includes one or more orifices that are complimentary to the orifice(s) in the valve disk. When misaligned, the shutter blocks the orifices that pass through the disk. When the shutter and disk are appropriately aligned, however, a flow of material may pass through the orifices and through the disk when the disk is oriented to block the flow of material through the valve—such as during testing.

Another alternative embodiment of the invention may take the form of a choke valve. As would be understood by one of skill in the art, a choke valve includes a bonnet portion that is attached to and extends from a body portion having a bore passing therethrough. The bore is typically divided into an inlet portion and an outlet portion that are arranged at a ninety degree angle to one another. A gasket having a seat is situated in an area of intersection of the inlet portion and outlet portion of the bore. A linearly displaceable stem is also provided and adapted to seal against the gasket seat when the valve is placed in a closed position. The stem is typically connected to a threaded shaft that passes through a section of the body portion and the bonnet portion. Rotation of the shaft via a connected handle is translated into linear movement of the stem.

As should be apparent, the stem would be sealed against the seat of the gasket during testing of a choke-type emergency shutdown valve, meaning that the flow of material through the valve would be blocked during a testing operation. In order to avoid fully blocking the flow of material through the valve during testing, a choke-type emergency shutdown valve embodiment of the invention includes a secondary stem that is concentrically arranged and separately displaceable within the first (primary) stem. For example, the secondary stem may include an actuation shaft that extends from within the actuation shaft of the primary stem for connection to a separate handle or other actuator.

Both the secondary stem and the primary stem have ports in the area thereof that will be in contact with a flow of material. Alternatively, a flow contacting section of each stem may be hollow and have orifices passing therethrough. In any case, the ports or orifices in the secondary stem are complimentary to the orifices in the primary stem. When misaligned, the body of the secondary stem blocks the orifices that pass through the primary stem. When the secondary stem and primary stem are appropriately aligned, however, a flow of material may pass through the ports/orifices and through the stems even when the primary stem is sealed against the seat of the gasket to block the flow of material through the valve. This allows a flow of material to pass through an emergency shutdown choke valve of the invention during valve testing.

A similar alternative embodiment of the invention may take the form of a needle valve. As would be understood by one of skill in the art, a needle valve is similar to a choke valve in that a needle valve also includes a bonnet portion that is attached to and extends from a body portion having a bore passing therethrough, as well as a linearly displaceable needle that is adapted to regulate a flow of material through the valve. In a needle valve, however, the needle typically seals against a recess of like conical shape or is otherwise adapted to more precisely control material flow than is a choke valve.

In a manner similar to that of a choke valve, the needle would be sealed against the wall of the recess or against some other part of a flow control chamber during testing of a needle-type emergency shutdown valve, meaning that the flow of material through the valve would be blocked during a testing operation. In order to avoid fully blocking the flow of material through the valve during testing, a needle-type emergency shutdown valve embodiment of the invention includes a secondary needle that is concentrically arranged within the first (primary) needle.

Both the secondary needle and the primary needle have ports in the area thereof that will be in contact with a flow of material. Alternatively, a flow contacting section of each needle may be hollow and have orifices passing therethrough. In any case, the ports or orifices in the secondary needle are complimentary to the orifices in the primary needle. When misaligned, the body of the secondary needle blocks the orifices that pass through the primary needle. When the secondary needle and primary needle are appropriately aligned, however, a flow of material may pass through the ports/orifices and through the needles even when the primary needle is in a sealing position so as to block the flow of material through the valve. This design allows a flow of material to pass through an emergency shutdown needle valve of the invention during valve testing.

Another alternative embodiment of the invention may take the form of a gate valve. As would be understood by one of skill in the art, a gate valve normally includes a body portion with a bore passing therethrough. A gate (disk) resides within the bore in the body portion. The diameter of the disk is generally somewhat larger than the diameter of the bore. The disk is linearly displaceable so that it may be retracted into a corresponding recess in the body portion when the valve is open.

An actuator is attached to the gate and extends through the body portion of the valve. The actuator is typically a handle attached to a threaded rod that engages like threads in the body portion. Rotation of the handle and rod is translated into linear movement of the gate. The gate may be set to a fully open or fully closed position, or to any number of partially closed positions therebetween. The gate would be fully extended so as to block off the bore during testing of a gate-type emergency shutdown valve, meaning that the flow of material through the valve would be blocked during a testing operation.

In a gate-type emergency shutdown valve embodiment of the invention, however, one or more orifices are placed in and pass through the gate. A shutter is also located within the gate. The shutter may also be disk-like in shape and may be linearly or rotatably movable within the gate. For example, the shutter may be attached to a separate, threaded actuation shaft, that is concentrically located within the actuation shaft of the gate. The shutter actuation shaft may extend beyond the gate actuation handle for connection to a shutter actuation handle.

The shutter includes one or more orifices that are complimentary to the orifices in the valve gate. When misaligned, the shutter blocks the orifices that pass through the gate. When the shutter and gate are appropriately aligned, however, a flow of material may pass through the orifices and through the shutter and gate when the gate is otherwise positioned to block the flow of material through the valve—such as during testing.

Another alternative embodiment of the invention may take the form of a diaphragm valve. As would be understood by one of skill in the art, a diaphragm valve normally includes a body portion with a bore passing therethrough. The bore typically includes an aperture that opens upward into a bonnet portion of the valve. The aperture between the bonnet and the body portion is closed off by a diaphragm that is normally connected to a compressor element. The compressor element is typically linearly displaceable within the bonnet and into the bore in the body portion, such that the compressor is able to reflect the diaphragm from its normal orientation and press the diaphragm against a section of the body portion that extends upwardly toward the diaphragm within the bore.

An actuator is attached to the compressor element for the purpose of causing the linear displacement thereof. The actuator is typically a handle (e.g., knob, hand wheel, etc.) attached to a threaded rod that engages like threads in the bonnet. Rotation of the handle and rod is translated into linear movement of the compressor element and the desired movement of the diaphragm.

When the compressor element places the diaphragm into sealing contact with the corresponding section of the body portion, flow through the bore and through the diaphragm valve is blocked. Moving the diaphragm from the sealed position toward a position where the associated compressor element is fully retracted results in an increasing amount of flow through the valve, until a maximum open position is reached. The diaphragm would be placed by the compressor into sealing contact with the corresponding section of the body portion during testing of a diaphragm-type emergency shutdown valve, meaning that the flow of material through the valve would be blocked during a testing operation.

In one diaphragm-type emergency shutdown valve embodiment of the invention, however, the section of the body portion that extends upwardly toward the diaphragm within the bore, or a portion of said section, is made to be movable. More particularly, the section of the body portion that extends upwardly toward the diaphragm within the bore may be movable toward and away from the position that results in sealing contact with the diaphragm, such that an opening may be created between the section of the body portion and the diaphragm while the diaphragm is held in the position it would occupy to normally prevent the flow of material through the valve.

In an alternate embodiment where only a part of the diaphragm-sealing section of the body portion is made to be movable, movement of that part produces an opening between a stationary piece of the diaphragm-sealing section of the body portion and the movable part thereof while the diaphragm is otherwise held in sealing contact with the stationary piece so as to prevent the normal flow of material through the valve. In either case, the opening allows material to pass through the valve while the compressor element and diaphragm are placed in the position they would occupy to close the valve. Consequently, a passage of material through the valve may be maintained during emergency shutdown testing of the valve.

A threaded shaft and handle, a pivot mechanism, etc., may be connected to and used to move the section of the body portion or the movable part thereof. Isolation techniques such as those used, for example, in gate or butterfly valves, can be applied to diaphragm valve embodiments of the invention to prevent leaks.

Other aspects and features of the invention will become apparent to those skilled in the art upon review of the following detailed description of exemplary embodiments along with the accompanying drawing figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 2a depicts one exemplary embodiment of a globe valve version of an emergency shutdown valve with bypass feature according to the invention;

FIG. 2b is an enlarged top view of a plug element of the emergency shutdown valve of FIG. 2a;

DETAILED DESCRIPTION OF EXEMPLARY EMBODIMENTS

Embodiments of the invention generally involve modifications to the various types of valves that may be, and frequently are, used as emergency shutdown valves. More particularly, a bypass feature(s) that includes one or more port or other passageways is provided in the shutoff element of a given valve and a movable obstruction(s) is added to selectively open or close the passageway so as to permit two modes of valve operation. In one mode of operation, a given valve may be placed in an open (i.e., operating) position whereby material flows through the valve in a normal manner. In this mode, the valve operates like any typical emergency shutdown valve. In a second mode of operation, the movable obstruction(s) may be placed in a non-obstructing position, such that a flow of material may pass through the shutoff element of the valve while the valve is in an otherwise fully closed position. This second mode of operation may be used during the testing procedures described above, such that a given emergency shutdown valve may be tested to determine if it achieves full closure while still permitting a flow of material to pass therethrough in support of an associated manufacturing or other operation.

Figure 1A:
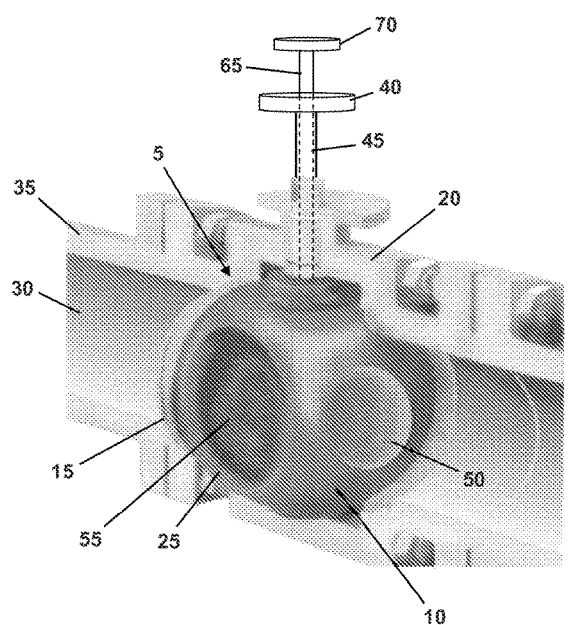
FIGS. 1a-1b depict one exemplary embodiment of a ball valve version of an emergency shutdown valve with bypass feature according to the invention.
Figure 1B:
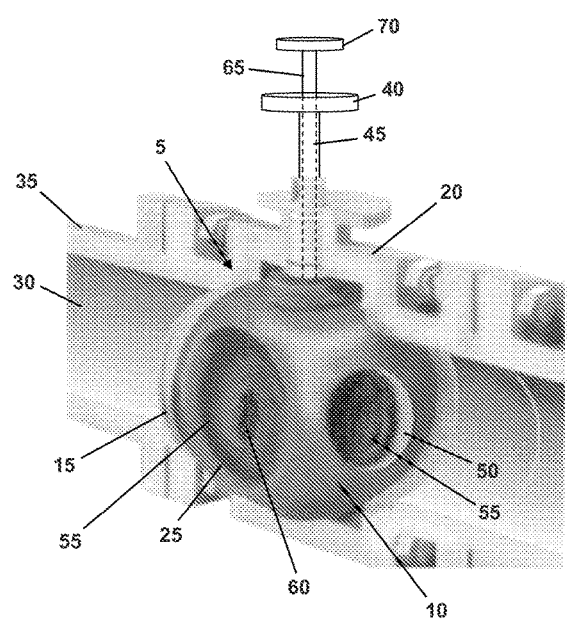

One exemplary embodiment of an emergency shutdown valve with a bypass feature is illustrated in FIGS. 1a-1b. This particular embodiment of the invention is in the form of a ball valve 5.

The emergency shutdown ball valve 5 includes a rotatable outer ball 10 that resides within a like-shaped chamber 15 in the body 20 of the valve. A through-port 25 passes diametrically through the ball valve 5 such that the through-port may be aligned with the interior bore 30 of a conduit 35 to which the ball valve is installed. The ball 10 also includes a secondary through-port 50 that passes through the ball along a diametrical axis that is substantially transverse to the central axis of the primary though-port 25 thereof. The ball 10 may be rotated within the chamber 15 by means of, for example, a handle 40 that is attached to an actuation shaft 45 that passes through the valve body 20 and connects to the ball.

Furthermore, an inner ball 55 is also present and concentrically and independently rotatably arranged within the main ball 10 of the ball valve 5. Like the outer ball 10, the inner ball 55 also includes a through-port 60 that passes through the ball along a diametrical axis thereof. The inner ball 55 may be rotated within the outer ball 10 by means of, for example, a handle 70 that is attached to an actuation shaft 65 that passes through the actuation shaft 45 of the outer ball and connects to the inner ball.

When the outer ball 10 and the inner ball 55 are oriented so that the primary through-port 25 of the outer ball and the through-port 60 of the inner ball are aligned with the conduit bore 30, material flowing through the conduit 35 is free to flow through the ball valve 5. Conversely, when the outer ball 10 is rotated so that the through-port 25 therein is oriented transversely to the conduit bore 30, as is shown in FIGS. 1a-1b and as the outer ball would be rotated during testing of the emergency shutdown testing of the ball valve 5, material flowing through the conduit 35 is either blocked from flowing through the outer ball and the ball valve or free to flow through the outer ball and the ball valve—depending on the orientation of the inner ball 55.

As depicted in FIG. 1a, when the outer ball 10 is placed in a conduit blocking orientation and the inner ball 55 is rotated so that the through-port 60 thereof is aligned with the secondary through-port 50 in the outer ball, material flowing through the conduit 35 may continue to flow through the outer and inner balls and through the ball valve 5 during emergency shutdown testing thereof. Conversely, and as depicted in FIG. 1b, when the outer ball 10 is placed in a conduit blocking orientation and the inner ball 55 is rotated so that the through-port 60 thereof is aligned with the primary through-port 25 in the outer ball, material flowing through the conduit 35 is blocked by the inner ball from flowing through the ball valve, and the valve operates as would a typical ball valve when placed in a closed position.

An alternative embodiment of an emergency shutdown valve of the invention in the form of a globe valve 100 is shown in FIGS. 2a-2b. As shown, the globe valve includes a body portion 105 which, in this particular embodiment, is generally spherical in shape. A bonnet portion 110 is attached to and extends from an upper area of the body portion 105. The globe valve is placed in a conduit 115 having an inlet portion 120 and an outlet portion 125.

An internal baffle 130 having a seat 135 formed thereon is located within the body portion 105 of the globe valve 100. As in a typical globe valve, a linearly displaceable plug 140 is also present and adapted to seal against the seat 135 of the baffle 130 in order to close the globe valve against a flow of material therethrough when desired. The plug 140 may be moved between open and closed positions by means of, for example, a threaded actuating shaft 145 that extends from the bonnet 110 and is connected to an actuating knob 150. Rotation of the knob 150 and shaft 145 is translated into a desired linear motion of the plug 145. As should be understood, the plug 140 would be engaged with and sealed against the seat 135 of the internal baffle 130 during emergency shutdown testing of the globe valve 100.

As can be seen in FIGS. 2a-2b, the plug 140 of this exemplary globe valve 100 of the invention is modified in comparison to a typical globe valve plug. Particularly, the plug 140 can be seen to include a partially hollow plug body 155 within which resides a rotatable disk 160. The disk 160 is rotatable within the plug body 155 in this particular example by means of a threaded actuating shaft 165 that is concentrically arranged within and extends from the plug actuating shaft 145. The disk actuating shaft 165 may also be connected to an actuation knob 170, as shown.

As can be best observed in FIG. 2b, both the plug body 155 and the disk 160 have a plurality of orifices 175, 180 passing respectively therethrough. The disk 160 may be rotated within the plug body 155 so that the orifices 175, 180 in each are aligned or misaligned as desired. With the orifices 175, 180 deliberately misaligned (as shown in FIG. 2b), flow through the globe valve 100 remains blocked when the plug 140 is sealed against the seat 135 of the internal baffle 130. However, during a testing operation, the disk 160 may be rotated such that the orifices 180 in the disk are aligned with the orifices 175 in the plug body 155. This allows a flow of material to pass completely through the plug 140 while the plug is sealed against the seat 135 of the baffle 130. Consequently, a flow of material may continue through the globe valve 100 even during emergency shutdown testing thereof.

Figure 3:
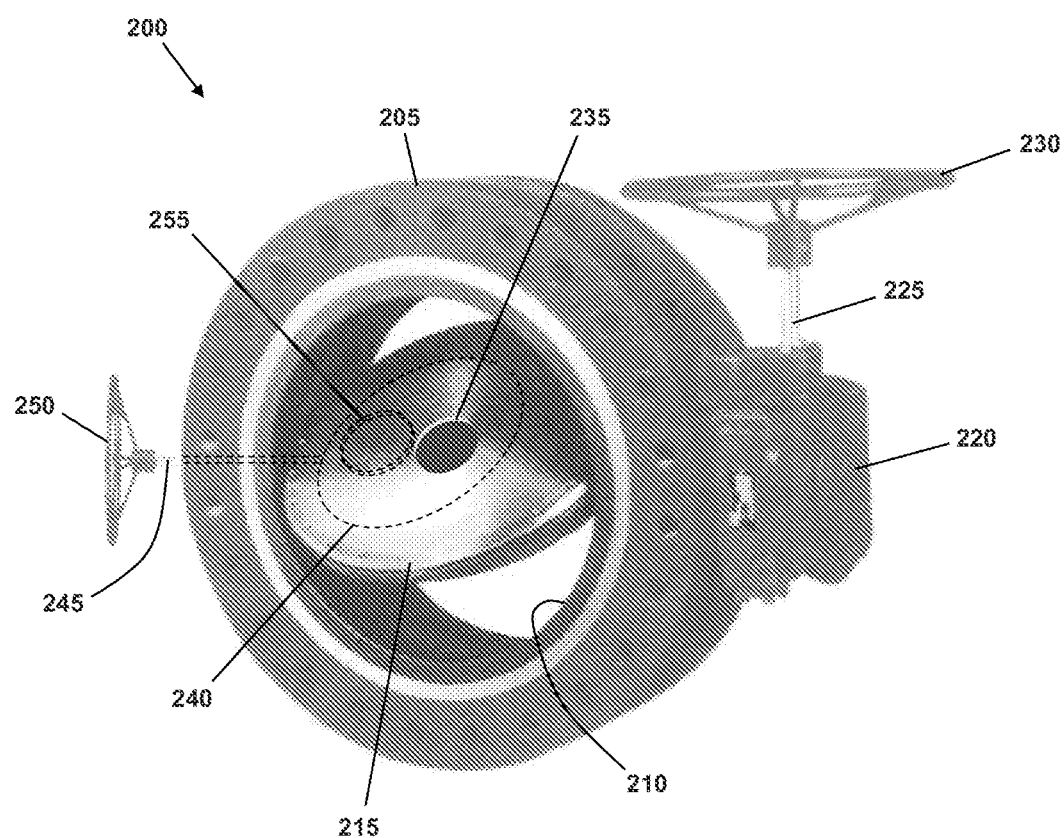
FIG. 3 depicts one exemplary embodiment of a butterfly valve version of an emergency shutdown valve with bypass feature according to the invention.

Another alternative embodiment of an emergency shutdown valve of the invention in the form of a butterfly valve 200 is shown in FIG. 3. As shown, the butterfly valve includes a body portion 205 which, in this particular embodiment, is generally cylindrical in shape. A round bore 210 passes through the body portion 205. The butterfly valve 200 is designed to be placed in a conduit (not shown) having an internal bore that is aligned with the bore 210 in the body portion of the butterfly valve.

A rotatable shutoff disk 215 resides within the bore 210 in the body portion 205. The shutoff disk 215 is rotatable about an axis that is perpendicular to the central axis of the bore 210 in the body portion 205. The diameter of the shutoff disk 215 may be similar to the diameter of the bore 210 in the body portion 205 and/or a sealing element may extend around the periphery of the shutoff disk to seal against the wall of the bore when the shutoff disk is appropriately rotated therein.

An actuator shaft (not visible) is attached to the shutoff disk 215 and extends through the body portion 205 of this particular butterfly valve 200 for purposes of facilitating disk rotation. In this particular embodiment, the other end of the actuator shaft is connected to a right angle gear box 220 to which is connected a second actuation shaft 225 and an associated hand wheel 230. The hand wheel 230 is used to rotate the shutoff disk 215 between a fully open position, where the edge of the shutoff disk is aligned with the flow path through the valve, and a fully closed position where the shutoff disk closes off the bore 210. As should be understood, the shutoff disk 215 would be rotated so as to close off the bore 210 during emergency shutdown testing of the butterfly valve 200.

In order to circumvent the problem of no material flow through the butterfly valve 200 during emergency testing thereof, the butterfly valve of this exemplary embodiment is provided with an orifice 235 that passes through the shutoff disk 215. A shutter 240 is also located within the shutoff disk 215 of the butterfly valve 200. The shutter 240 may also be disk-like in shape and may be linearly or rotatably movable within the shutoff disk 215.

In this particular example, the shutter 240 is attached to a separate threaded shaft 245 that passes through the body portion 205 and into the shutoff disk 215 where it connects with the shutter. The opposite end of the shutter actuation shaft 245 is connected to a shutter actuation hand wheel 250. At least a section of the body portion 205 through which the shutter actuation shaft 245 passes may be threaded like the shutter actuation shaft such that rotation of the shaft by the hand wheel 250 is translated into linear movement of the shutter 240. In other embodiments, rotational shutter movement may be substituted for linear shutter movement, such as by rotationally pinning the shutter within the shutoff disk and proving gear teeth or similar elements in the body portion and about the shutter periphery that may be engaged by a corresponding rotation-inducing motive device.

In any case, the shutter 240 includes an orifice 255 that is complimentary to the orifice 235 in the shutoff disk 215. When the orifices 235, 255 in the shutter 240 and the shutoff disk 215 are misaligned, as depicted in FIG. 3, the shutter blocks the orifice that passes through the shutoff disk such that placing the disk in a closed position blocks material flow through the valve in a normal manner. However, when the shutter 240 is displaced such that the orifices 235, 255 in the shutter and the shutoff disk 215 are aligned, a flow of material may pass through the orifices and through the shutoff disk even when the disk is oriented to block the flow of material through the valve. Consequently, a flow of material may be continued even during emergency shutdown testing of the butterfly valve 200.

Figure 4:
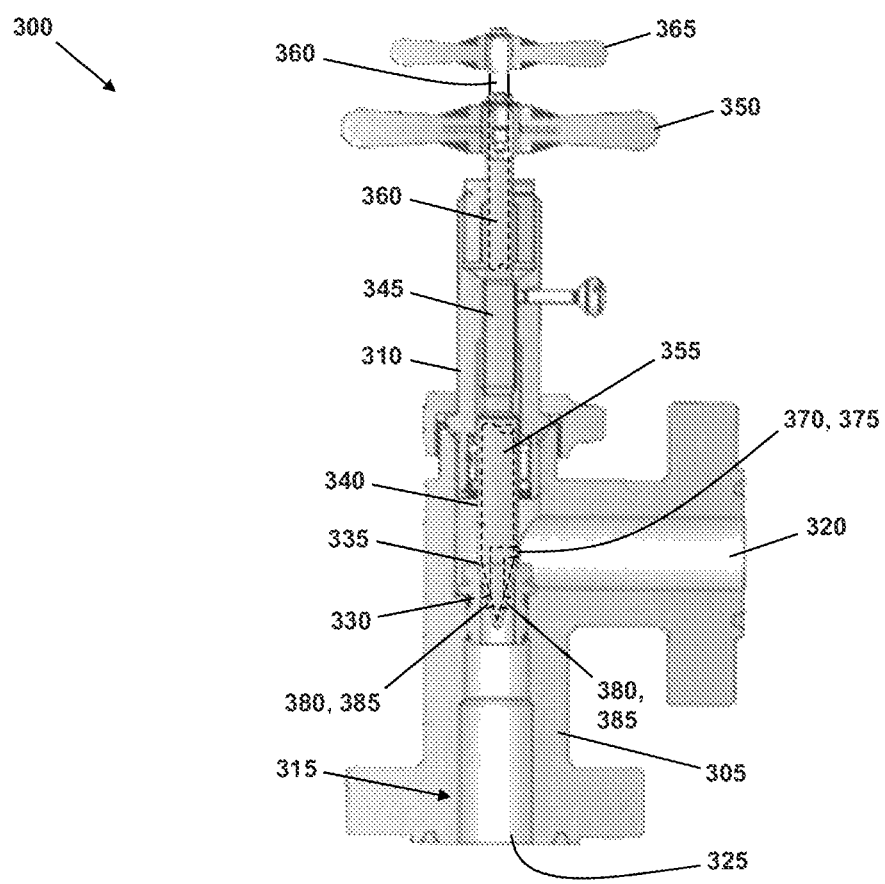
FIG. 4 depicts one exemplary embodiment of a choke valve version of an emergency shutdown valve with bypass feature according to the invention.

Another alternative embodiment of an emergency shutdown valve of the invention in the form of a choke valve 300 is depicted in FIG. 4. As shown, the choke valve includes a lower, body portion 305, and an upper, bonnet portion 310. A bore 315 passes through the lower body portion 305, and is divided into an inlet portion 320 and an outlet portion 325 that are arranged at a ninety degree angle to one another.

A gasket 330 having a seat 335 is situated in an intersecting area of the inlet portion 320 and the outlet portion 325 of the bore 315. A linearly displaceable sealing stem 340 is also provided and adapted to seal against the gasket seat 335 when the choke valve 300 is placed in a closed position. The sealing stem 340 is, in this exemplary embodiment, connected to a threaded actuation shaft 345 that passes through a section of the body portion 305 and through the bonnet 310. Rotation of the sealing stem actuation shaft 345 via a connected handle 350 is translated into upward and downward linear movement of the sealing stem 340.

As should be apparent, the sealing stem 340 would be sealed against the seat 335 of the gasket 330 during emergency shutdown testing of the choke valve 300, meaning that the flow of material through the choke valve would be blocked during an emergency shutdown testing operation. In order to avoid fully blocking the flow of material through the choke valve 300 during testing, a secondary stem 355 is concentrically arranged and separately linearly or rotationally displaceable within the sealing stem 340. In this example, the secondary stem 355 includes an actuation shaft 360 that extends from within the actuation shaft 345 of the sealing stem 340 and connects to a separate handle 365.

To permit the flow of material through the choke valve 300 during an emergency shutdown testing operation, both the secondary stem 355 and the sealing stem 340 have ports 370, 375 in the areas thereof that will be in contact with a flow of material. Alternatively, a flow contacting section of each stem 340, 355 may be hollow and have orifices passing therethrough.

In the exemplary embodiment of FIG. 4, cooperating ports 370, 375 pass through the sealing stem 340 and the secondary stem 355 in the area of the stems that will be in contact with a flow of material through the inlet port 320 portion of the bore 315 when the choke valve 300 is closed. Additionally, cooperating ports 380, 385 pass through the sealing stem 340 and the secondary stem 355 in the area of the stems that will reside in the outlet port 325 portion of the bore 315 when the choke valve 300 is closed. The inlet port 375 in the secondary stem 355 is connected to the outlet ports 385 in the secondary stem.

When the ports in the sealing stem 340 and the secondary stem 355 are misaligned, the body of the secondary stem blocks the ports that pass through the sealing stem and no material flows through the valve when the sealing stem is sealed against the seat 335 of the gasket 330. However, when the ports in the sealing stem 340 and the secondary stem 355 are aligned, such as by appropriately rotating or linearly displacing the secondary stem, a flow of material may pass through the ports in the stems even when the sealing stem is sealed against the seat 335 of the gasket 330 to otherwise block the flow of material through the choke valve 300. Consequently, a flow of material may be continued even during emergency shutdown testing of the choke valve 300.

Figure 5:
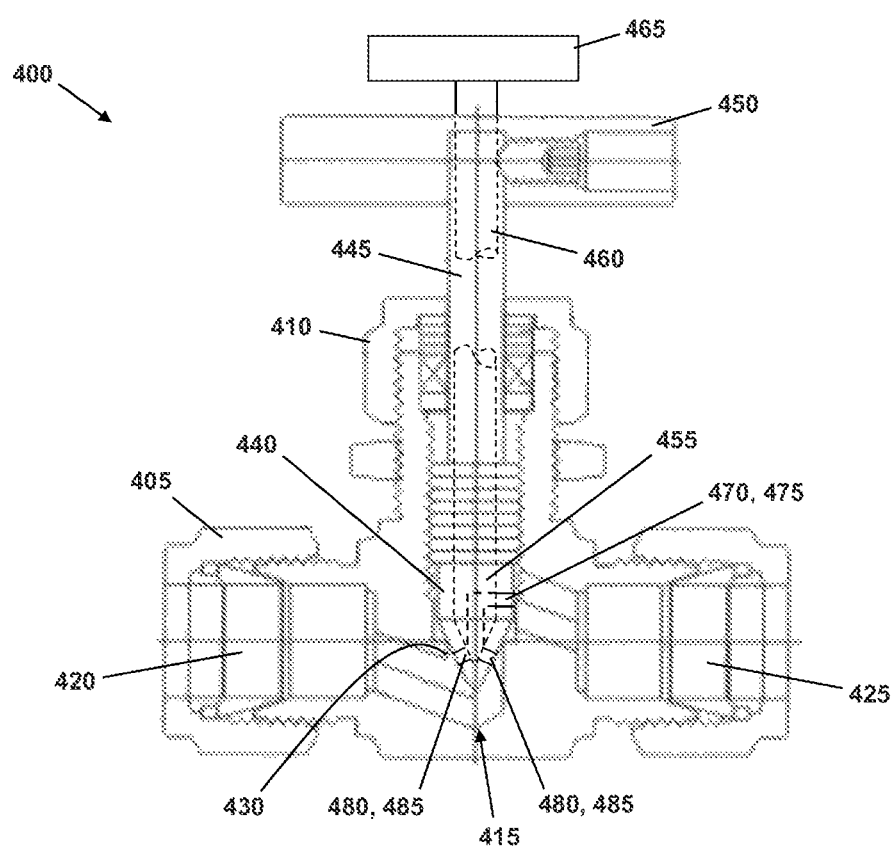
FIG. 5 depicts one exemplary embodiment of a needle valve version of an emergency shutdown valve with bypass feature according to the invention.

A similar alternative embodiment of the invention in the form of a needle valve 400 is shown FIG. 5. As shown, the needle valve includes a lower, body portion 405, and an upper, bonnet portion 410. A bore 415 passes through the lower body portion 405, and is divided into an inlet portion 420 and an outlet portion 425 that are separated by a flow control chamber 430.

A linearly displaceable sealing needle 440 is also provided and adapted to seal within the flow control chamber 430 when the needle valve 400 is placed in a closed position. The sealing needle 440 is, in this exemplary embodiment, connected to a threaded actuation shaft 445 that passes through a section of the body portion 405 and through the bonnet 410. Rotation of the sealing needle actuation shaft 445 via a connected handle 450 is translated into upward and downward linear movement of the sealing needle 440.

As should be apparent, the sealing needle 440 would be sealed within the flow control chamber 430 during emergency shutdown testing of the needle valve 400, meaning that the flow of material through the needle valve would be blocked during an emergency shutdown testing operation. In order to avoid fully blocking the flow of material through the needle valve 400 during testing, a secondary needle 455 is concentrically arranged and separately linearly or rotationally displaceable within the sealing needle 440. In this example, the secondary needle 455 includes an actuation shaft 460 that extends from within the actuation shaft 445 of the sealing needle 440 and connects to a separate handle 465.

To permit the flow of material through the needle valve 400 during an emergency shutdown testing operation, both the secondary needle 455 and the sealing needle 440 have ports 470, 475 in the areas thereof that will be in contact with a flow of material. Alternatively, a flow contacting section of each needle 440, 455 may be hollow and have orifices passing therethrough.

In the exemplary embodiment of FIG. 5, cooperating ports 470, 475 pass through the sealing needle 440 and the secondary needle 455 in the area of the needles that will be in contact with a flow of material through the inlet port 420 portion of the bore 415 when the needle valve 400 is closed. Additionally, cooperating ports 480, 485 pass through the sealing needle 440 and the secondary needle 455 in the area of the needles that will reside in the outlet port 425 portion of the bore 415 when the needle valve 400 is closed. The inlet port 475 in the secondary needle 455 is connected to the outlet ports 485 in the secondary needle.

When the ports in the sealing needle 440 and the secondary needle 455 are misaligned, the body of the secondary needle blocks the ports that pass through the sealing needle and no material flows through the needle valve 400 when the sealing needle is sealed in the flow control chamber 430. However, when the ports in the sealing needle 440 and the secondary needle 455 are aligned, such as by appropriately rotating or linearly displacing the secondary needle, a flow of material may pass through the ports in the needles even when the sealing needle is sealed in the flow control chamber to otherwise block the flow of material through the needle valve 400. Consequently, a flow of material may be continued even during emergency shutdown testing of the needle valve 400.

Figure 6:
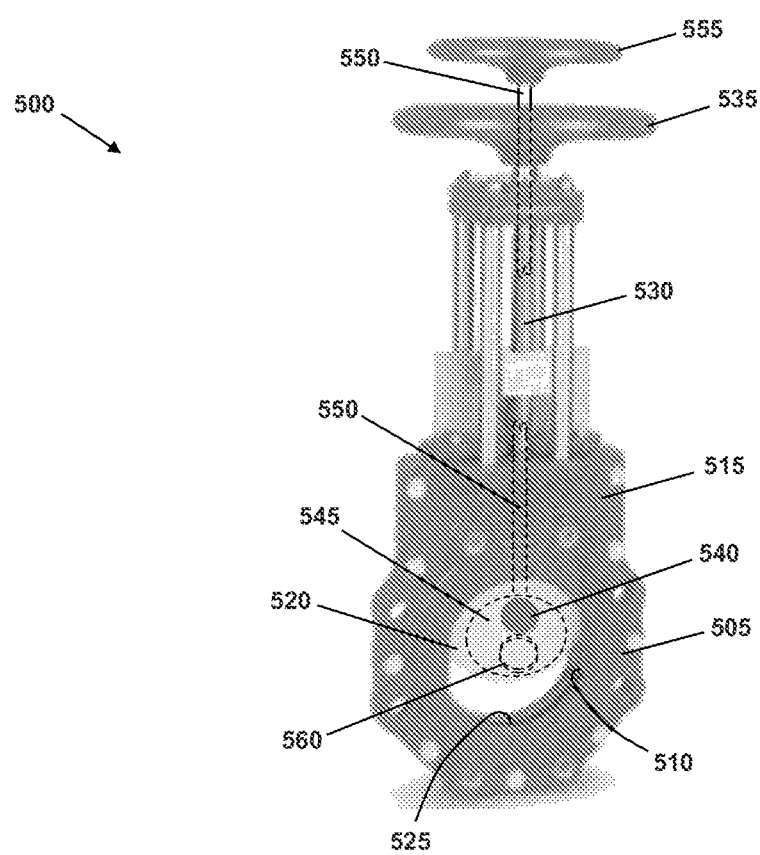
FIG. 6 depicts one exemplary embodiment of a gate valve version of an emergency shutdown valve with bypass feature according to the invention.

Another alternative embodiment of an emergency shutdown valve of the invention in the form of a gate valve 500 is shown in FIG. 6. As shown, the gate valve 500 includes a body portion 505 which, in this particular embodiment, is generally cylindrical in shape. A round bore 510 passes through the body portion 505. A bonnet portion 515 extends upward from the body portion 505. The gate valve 500 is designed to be placed in a conduit (not shown) having an internal bore that is aligned with the bore 510 in the body portion of the gate valve.

A disk-shaped gate 520 resides within the bore 510 in the body portion 505 of the gate valve 500. The diameter of the gate 520 is generally somewhat larger than the diameter of the bore 510, such that the gate is able to close off the bore when the gate valve 500 is placed in a closed position. The gate 520 is linearly displaceable within a peripheral slot 525 in the bore 510, and may be retracted into a portion of the slot that extends into the bonnet 515 when the valve is opened.

A gate actuator shaft 530 is attached to the gate 520 and extends through the body portion 505 and through the bonnet portion 515 for purposes of facilitating gate displacement. The gate actuator shaft 530 may be attached to an actuator such as the hand wheel 535 shown. Rotation of the hand wheel 535 and the gate actuator shaft 530 is translated into linear movement of the gate 520, which can be located at various positions between closed and fully open. As should be understood, the gate 520 would be lowered so as to fully block off the bore 510 during emergency shutdown testing of the gate valve 200.

In order to circumvent the problem of no material flow through the gate valve 500 during emergency testing thereof, the gate 520 of this particular gate valve embodiment is provided with an orifice 540 that passes through the gate. A shutter 545 is also located within the gate 520 of the gate valve 500. The shutter 545 may also be disk-like in shape and may be linearly or rotatably movable within the gate 520.

In this particular example, the shutter 545 is attached to a separate threaded shaft 550 that passes through the body portion 505 and into the gate 520 where it connects with the shutter. The opposite end of the shutter actuation shaft 550 is connected to a shutter actuation hand wheel 555. Rotation of the shutter actuation shaft 550 by the hand wheel 555 is translated into linear movement of the shutter 545. In other embodiments, rotational shutter movement may be substituted for linear shutter movement, such as by rotationally pinning the shutter within the gate and proving gear teeth or similar elements in the body portion 505 or bonnet portion 510 and about the shutter periphery that may be engaged by a corresponding rotation-inducing motive device.

In any case, the shutter 545 includes an orifice 560 that is complimentary to the orifice 540 in the gate 520. When the orifices 560, 540 in the shutter 545 and the gate 520 are misaligned, as depicted in FIG. 6, the shutter blocks the orifice that passes through the gate so that placing the gate in a closed position blocks material flow through the gate valve 500 in a normal manner. However, when the shutter 545 is displaced such that the orifices 560, 540 in the shutter and the gate 520 are aligned, a flow of material may pass through the orifices and through the gate even when the gate is oriented to block the flow of material through the gate valve 500. Consequently, a flow of material may be continued even during emergency shutdown testing of the gate valve 500.

Figure 7:
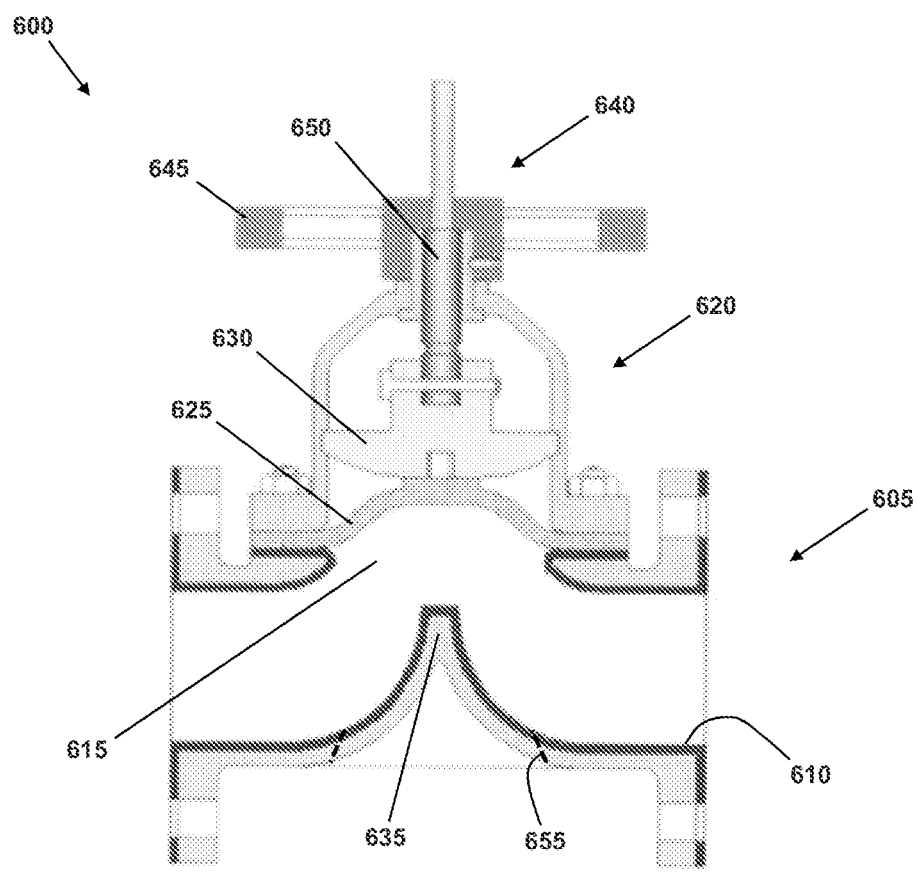
FIG. 7 depicts one exemplary embodiment of a diaphragm valve version of an emergency shutdown valve with bypass feature according to the invention.

Another alternative embodiment of an emergency shutdown valve of the invention in the form of a diaphragm valve 600 is shown in FIG. 7. This particular embodiment of the diaphragm valve 600 includes a body portion 605 with a bore 610 passing therethrough. The bore 610 includes an aperture 615 that opens upward into a bonnet portion 620 of the valve. The aperture 615 between the bonnet 620 and the body portion 605 is closed off by an elastomeric diaphragm 625 that is connected to a compressor element 630. The compressor element 630 is linearly displaceable within the bonnet 620 and is extendable into the bore 610 in the body portion 605 to reflect the diaphragm 625 from its normal operating orientation (shown) and press the reflected diaphragm against a section 635 of the body portion that extends upwardly toward the diaphragm within the bore.

An actuator 640 is attached to the compressor element 630 for the purpose of causing the linear displacement thereof. In this particular exemplary embodiment, the actuator 640 is a hand wheel 645 attached to a threaded rod 650 that engages corresponding threads in the bonnet 620. Rotation of the hand wheel 645 and the rod 650 is translated into linear movement of the compressor element 630 and a desired movement of the diaphragm 625.

When the compressor element 630 places the diaphragm 625 into sealing contact with the corresponding section 635 of the body portion 605, flow through the bore 610 and through the diaphragm valve 600 is normally blocked. Reflecting the diaphragm 625 and moving the diaphragm from a sealed position toward a position where the associated compressor element 630 is fully retracted results in an increasing amount of flow through the valve 600, until a maximum open position is reached (shown).

As should be understood, the diaphragm 625 would be placed by the compressor element 630 into sealing contact with the corresponding section 635 of the body portion 605 during testing of such a diaphragm-type emergency shutdown valve 600. This means that the flow of material along the normal flow path through the valve would be blocked during a testing operation.

Therefore, in the diaphragm-type emergency shutdown valve embodiment shown in FIG. 7, the section 635 of the body portion 605 that extends upwardly toward the diaphragm 625 within the bore 610 of the valve 600 is movable. More particularly, the section 635 of the body portion that extends upwardly toward the diaphragm 625 within the bore 610 is movable toward and away from the position shown, which is the position that normally results in sealing contact with the diaphragm. In this regard, the body portion 605 may be divided into movable and non-movable parts in the area of the extending sealing section 635, as is represented by the dashed dividing lines 655. In an alternate embodiment (not shown), only a part of the diaphragm-sealing section 635 of the body portion 605 is movable.

Movement of the diaphragm-sealing section 635 of the body portion 605 away from the diaphragm 625, or movement of a part of the diaphragm-sealing section of the body portion in the same manner, results in an opening between the diaphragm-sealing section of the body portion and the diaphragm or an opening between a stationary piece of the diaphragm-sealing section of the body portion and the movable part thereof, respectively, while the diaphragm is otherwise maintained in a closed position to prevent the normal flow of material through the valve 600. The created opening allows material to pass through the valve 600 while the compressor element 630 and diaphragm 625 are held in their closed positions. Consequently, the diaphragm-type emergency shutdown valve 600 may still pass some amount of material during emergency shutdown testing of the valve.

Although not shown in FIG. 7 for purposes of clarity, a threaded shaft and handle, a pivot mechanism, etc., may be connected to and used to move the diaphragm-sealing section 635 of the body portion 605 or a movable part thereof. Isolation techniques such as those used with, for example, gate or butterfly valves, can be applied to diaphragm valve embodiments of the invention to prevent any leaks that might result from separating the diaphragm-sealing section 635 of the body portion 605 from the remainder thereof.

In another version of a diaphragm-type emergency shutdown valve according to the invention, the diaphragm-sealing section of the body portion may be non-movable as normal, but a bypass orifice may be placed through a section thereof for use during valve testing. A displaceable shutter may then be located so as to open or close the orifice when desired, such as by moving within a slot in the body portion of the valve. An actuator capable of imparting rotational or liner motion that is sufficient to displace the shutter may be provided, and may be any type of actuator previously mentioned.

When the shutter is extended into the diaphragm-sealing section of the body portion, the shutter blocks the orifice that passes therethrough. When the shutter is sufficiently withdrawn from the diaphragm-sealing section of the body portion, however, a flow of material may pass through the orifice and through the valve when the diaphragm and associated compressor element are otherwise positioned to block the flow of material through the valve—such as during testing.

It is to be realized that the bypass feature(s) provided in any embodiment of the invention, including the exemplary embodiments described and shown herein, are separately operable from the primary shutoff element of the associated emergency shutdown valve. This means that the bypass feature(s) of a given valve may be tested for proper operation separately from the emergency shutdown testing of the primary shutoff element of the associated valve. Consequently, an emergency shutdown valve of the invention may be tested to ensure proper operation of the primary shutoff element while maintaining a flow of material through the valve via the bypass feature thereof. The bypass feature may be separately tested to ensure that it will properly function to prevent a flow of material through the primary shutoff element when desired.

Various exemplary embodiments of emergency shutdown valves according to the invention have been shown and described herein for purposes of illustration. It is to be understood, however, that nothing herein is to be interpreted as limiting the invention to said exemplary embodiments. For example, one of skill in the art would understand that multiple variations of each of the general valve types described herein are possible. Additionally, the exemplary bypass features shown and described may differ in number, size, shape and/or location in other embodiments. Bypass feature actuation may also differ in other embodiments, such as via use of linear displaceable actuators in place of threaded actuators and/or powered actuators in place of human-operated actuators.

Therefore, while certain exemplary embodiments of the present invention are described in detail above, the scope of the invention is not to be considered limited by such disclosure, and modifications are possible without departing from the spirit of the invention as evidenced by the following claims:

The invention claimed is:

1. An emergency shutdown valve in the form of a ball valve and having a bypass feature that permits a flow of material to pass through the valve while the valve is in a closed position, comprising:
   a valve body portion;
   a passageway through the valve body portion for allowing passage of the flow of material through the valve;
   a shutoff element in the form of a rotatable ball seated in the passageway, the rotatable ball including a diametrically located primary through-port and being selectively movable between an open position and a closed position to allow or prohibit the flow of material through the primary through-port and the emergency shutdown valve; and
   a bypass feature associated with the rotatable ball shutoff element, the bypass feature including a secondary through-port that passes through the rotatable ball shutoff element along an axis that is substantially transverse to the primary through-port and is positionable within the passageway in the valve body such that the flow of material may pass through the rotatable ball shutoff element when the shutoff element is in the closed position;
   an inner ball that includes a diametrically located through-port and is concentrically and rotatably arranged within the rotatable ball shutoff element to form an inner ball-outer ball arrangement, the inner ball being independently rotatable relative to the rotatable ball shutoff element between a position where the inner ball obstructs flow through the secondary through-port of the rotatable ball shutoff element, and a position where the through-port in the inner ball is partially or fully aligned with the secondary through-port in the rotatable ball shutoff element when the rotatable ball shutoff element is in the closed position, thereby allowing material to flow from the passageway through the secondary through-port in the rotatable ball shutoff element and through the emergency shutdown valve while the rotatable ball shutoff element is closed; and
   an inner ball actuation shaft that passes concentrically through a rotatable ball shutoff element actuation shaft.

2. A bypass feature for permitting a flow of material to pass through a ball valve type emergency shutdown valve during the testing thereof for proper closure functionality, the ball valve having a valve body portion, a passageway through the valve body portion for allowing passage of the flow of material through the valve, and a shutoff element in the form of a rotatable ball seated in the passageway, the rotatable ball including a primary through-port and being selectively movable between an open position and a closed position to allow or prohibit the flow of material through the through-port and the emergency shutdown valve, the bypass feature comprising:
   a secondary through-port that passes through the rotatable ball shutoff element along an axis that is substantially transverse to the primary through-port and is positionable within the passageway in the valve body such that the flow of material may pass through the rotatable ball shutoff element when the rotatable ball shutoff element is in the closed position;
   an inner ball that includes a diametrically located through-port and is concentrically and rotatably arranged within the rotatable ball shutoff element to form an inner ball-outer ball arrangement, the inner ball being independently rotatable relative to the rotatable ball shutoff element between a position where the inner ball obstructs flow through the secondary through-port of the rotatable ball shutoff element, and a position where the through-port in the inner ball is partially or fully aligned with the secondary through-port in the rotatable ball shutoff element when the rotatable ball shutoff element is in the closed position, thereby allowing material to flow from the passageway through the secondary through-port in the rotatable ball shutoff element and through the emergency shutdown valve while the rotatable ball shutoff element is closed; and an inner ball actuator shaft that passes concentrically through a rotatable ball shutoff element actuator shaft.

3. A method of testing an emergency shutdown valve for proper closure functionality while simultaneously permitting a flow of material to pass therethrough, the emergency shutdown valve being a ball valve having a valve body portion, a passageway through the valve body portion for allowing passage of the flow of material through the emergency shutdown valve, and a shutoff element in the form of a rotatable ball seated in the passageway, the rotatable ball including a primary through-port and being selectively movable between an open position and a closed position to allow or prohibit the flow of material through the primary through-port and the emergency shutdown valve, the method comprising:

providing the rotatable ball shutoff element of the emergency shutdown valve with a separately operable bypass feature, the bypass feature including a secondary through-port that passes through the rotatable ball shutoff element along an axis that is substantially transverse to the primary through-port and is positionable within the passageway in the valve body such that the flow of material may pass through the rotatable ball shutoff element while the rotatable ball shutoff element is in the closed position;

concentrically locating an inner ball within the rotatable ball shutoff element to form a rotatable inner ball-outer ball arrangement, the inner ball including a diametrically located through-port and being independently rotatable relative to the rotatable ball shutoff element between a position where the inner ball obstructs flow through the secondary through-port of the rotatable ball shutoff element, and a position where the through-port in the inner ball is partially or fully aligned with the secondary through-port in the rotatable ball shutoff element when the rotatable ball shutoff element is in the closed position, thereby allowing material to flow from the passageway through the secondary through-port in the rotatable ball shutoff element and through the emergency shutdown valve while the rotatable ball shutoff element is closed;

configuring the inner ball and the rotatable ball shutoff element such that an inner ball actuator shaft passes concentrically through a rotatable ball shutoff element actuator shaft;

placing the rotatable ball shutoff element in a closed position, whereby the secondary through-port in the rotatable ball shutoff element is partially or fully aligned with the passageway through the valve body portion; and rotating the inner ball when desired to partially or fully align the through-port in the inner ball with the secondary through-port in the rotatable ball shutoff element and to thereby permit a flow of material to pass through the rotatable ball shutoff element and the emergency shutdown valve while the rotatable ball shutoff element is in the closed position.

4. The emergency shutdown valve of claim 1, further comprising an inner ball actuator element that is manipulable from outside of the valve body portion of the emergency shutdown valve.

5. The emergency shutdown valve of claim 4, wherein the inner ball actuator element is coupled to the inner ball actuation shaft, which is configured to extend from the inner ball and to protrude through an opening in the valve body portion.

6. The emergency shutdown valve of claim 5, wherein the inner ball actuator element is a handle or knob.

7. The bypass feature of claim 2, further comprising an inner ball actuator element that is manipulable from outside of the valve body portion of the emergency shutdown valve.

8. The bypass feature of claim 7, wherein the inner ball actuator element is coupled to the inner ball actuation shaft, which is configured to extend from the inner ball and to protrude through an opening in the valve body portion.

9. The bypass feature of claim 8, wherein the inner ball actuator element is a handle or knob.

10. The method of claim 3, wherein:

the inner ball of the bypass feature includes an inner ball actuator element that is coupled to the inner ball actuation shaft and is located outside of the valve body portion of the emergency shutdown valve; and operation of the inner ball is accomplished by manipulating the inner ball actuator element from outside of the valve body portion of the emergency shutdown valve.

* * * * *